United States Patent [19]
Fischer

[11] 4,298,934
[45] Nov. 3, 1981

[54] PROGRAMMABLE MEMORY PROTECTION LOGIC FOR MICROPROCESSOR SYSTEMS

[75] Inventor: Rudolf Fischer, Munich, Fed. Rep. of Germany

[73] Assignee: Siemens Aktiengesellschaft, Berlin & Munich, Fed. Rep. of Germany

[21] Appl. No.: 65,649

[22] Filed: Aug. 10, 1979

[30] Foreign Application Priority Data

Sep. 29, 1978 [DE] Fed. Rep. of Germany ....... 2842548

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,742,458 | 6/1973 | Inoue et al. | 364/200 |
| 3,827,029 | 7/1974 | Schlotterer et al. | 364/200 |
| 4,087,856 | 5/1978 | Attanasio | 364/200 |

*Primary Examiner*—Raulfe B. Zache
*Attorney, Agent, or Firm*—Hill, Van Santen, Steadman, Chiara & Simpson

[57] ABSTRACT

A microprocessor system incorporates a buffer limit address register for identifying a memory area to be protected in a microprocessor system, and an address error recognition device responsive thereto for controlling the suppression of a memory write signal in recognition of an address error.

4 Claims, 7 Drawing Figures

PROGRAMMABLE MEMORY PROTECTION LOGIC FOR MICROPROCESSOR SYSTEMS

FIELD OF THE INVENTION

The present invention relates to a programmable memory protection circuit for microprocessor systems.

THE PRIOR ART

Microprocessors are not equipped with any means for the protection of memory against unauthorized access. In more complex microcomputer systems which work with an operating system, serious problems sometimes occur, particularly during the program test, when a program to be tested overwrites the unprotected operating system or enters the operating system at an undefined location.

In the past, it was the responsibility of the programmer of a microcomputer system to care that his program did not actuate any inadmissible memory access. However, it is during testing of programs that uncontrolled memory access cannot always be avoided, with the result that it occurs relatively often that important system programs located in RAM are overwritten by an incorrectly sequencing user program, without generation of an error report. In the most unfavorable case, the destroyed system programs can, after their start, destroy a data base, for example, maintained in an associated floppy disk, by overwriting it.

It is therefore desirable to provide a system for protecting the memory against unallowable access.

BRIEF DESCRIPTION OF THE INVENTION

It is principal object of the present invention to provide a programmable memory protection system for protecting specific memory areas of a microprocessor system against unallowable access.

This object is achieved in the present invention by means of a programmable memory protection system having a buffer limit address register for storing at least one buffer limit address characterizing the memory area to be protected. An address error recognition device is provided, responding to the content of the buffer limit address register, and to an address present on an address bus during instruction execution. Control logic is provided for suppressing a memory write signal in response to an address error signal issued by the address error recognition device.

By the use of the present invention, one or more areas of the memory of the microprocessor system are protected against unallowable writing or reading access by means of erroneous user programs or by means of erroneous operations by the programmer.

BRIEF DESCRIPTION OF THE DRAWINGS

Reference will now be made to the accompanying drawings in which.

DESCRIPTION OF THE PREFERRED EMBODIMENTS

The memory protection system of the present invention compares an address appearing at the beginning of each machine cycle, on an address bus of a microprocessor system, with a value previously entered into a buffer limit address register. The result of this comparison is used to protect specific memory areas. When this comparison shows that the pending address is within a protected memory location, a writing access is prevented.

When an access to a protected memory location is recognized, the memory protection system breaks off the sequencing program with a return into the operating system after execution of the instruction during which the inadmissible access was attempted. This return cannot be initiated with an interrupt, however, since microprocessors such as the SAB8080 are not provided with a non-maskable interrupt, and a memory protection alarm which occurs while the interrupt is disabled would remain without effect. It has been found, to the contrary, that the memory protection system must suppress the reading of the following instruction out of the memory and instead cause the processor to jump to a new instruction. In this way a program is started which reads the address of the instruction which caused the memory protection alarm, and the address to which access was desired, from two registers of the memory protection logic. These two addresses are provided as outputs to a console to allow analysis by the user-programmer.

Figure 1:
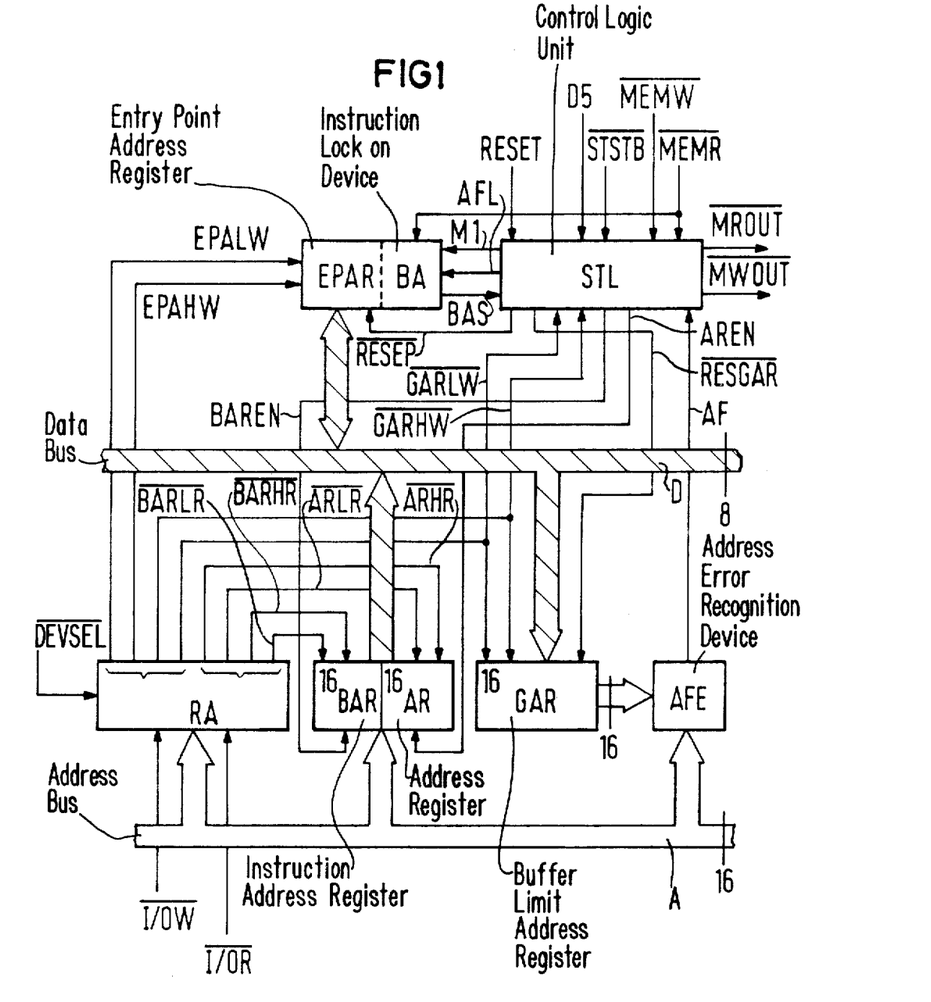
FIG. 1 is a functional block diagram of an illustrative embodiment of the present invention.
Figure 2:
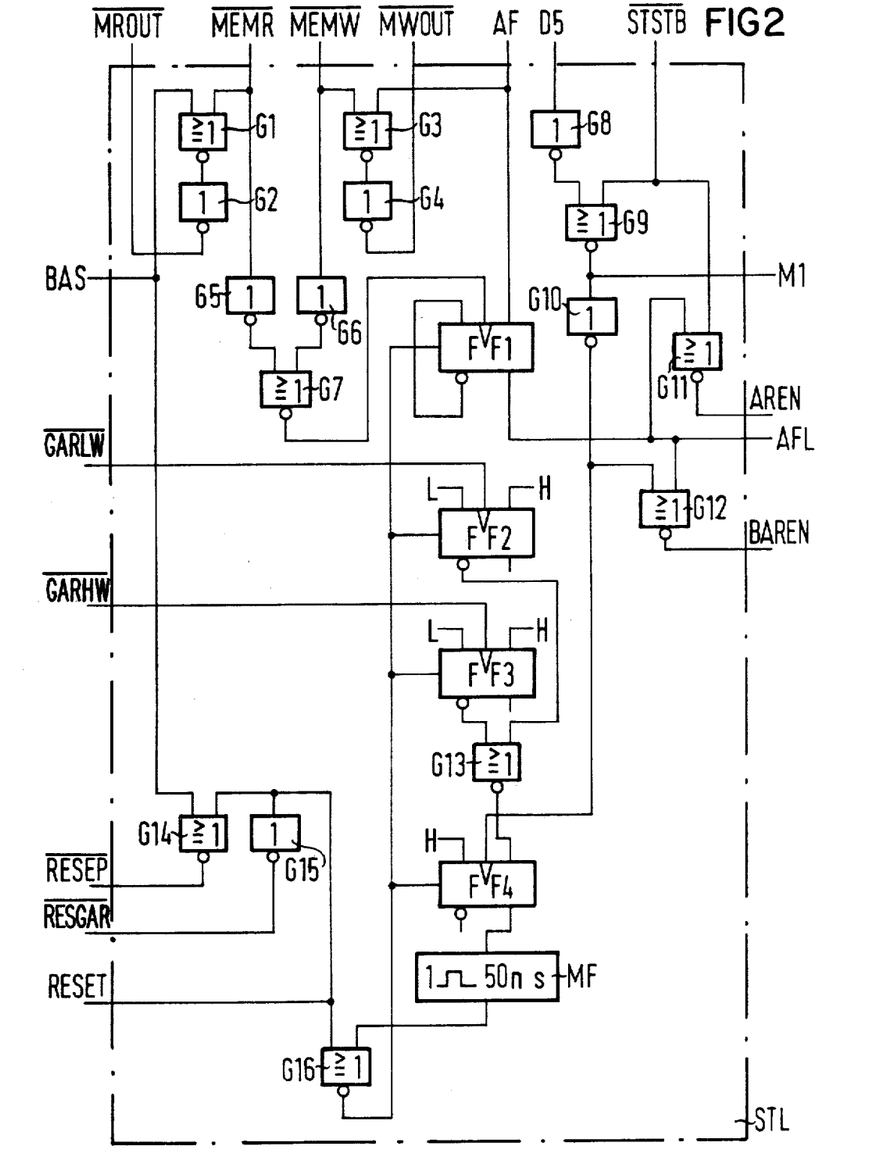
FIG. 2 is a more detailed functional block diagram of the control logic unit STL of FIG. 1.

In FIG. 1, the general organization of a microprocessor system incorporating the present invention is illustrated. It incorporates a control logic unit STL which is illustrated in more detail in FIG. 2.

The control unit STL receives the signals $\overline{\text{MEMR}}$ and $\overline{\text{MEMW}}$ from the microprocessor and relays them to the memory as $\overline{\text{MROUT}}$ and $\overline{\text{MWOUT}}$. However, when an AF signal is present, produced by the address error recognition device AFE (FIG. 1), it blocks the relaying of a $\overline{\text{MEMW}}$ signal and thus prevents the overwriting of a protected memory location.

At the same time, the control logic STL outputs the signals AREN and BAREN to the address register AR and the instruction address register BAR (FIG. 1), to prevent the reading of the address bus A (FIG. 1) into the address register AR and the instruction address register BAR, so that the address of the instruction which caused the memory protection alarm, as well as the address of the memory located which was to be addressed, are retained in the corresponding registers for later analysis. Subsequently, at the next instruction fetch cycle, the control logic STL prevents the reading of the next instruction out of the memory by blocking the $\overline{\text{MROUT}}$ output, and instead starts the instruction lock-on. This, respectively synchronized with $\overline{\text{MEMR}}$, then switches the machine code of a jump instruction on the data bus D, passing control to the instruction at the address previously stored in an entry point address register EPAR which is connected to the data bus D, thereby causing the processor to execute a jump into the system programs.

The beginning of the instruction lock-on is reported to the control logic STL with the signal BAS, whereupon the buffer limit address register GAR is reset, thus preventing the further occurrence of a memory protection alarm until the re-programming of the buffer limit address register GAR. This ensures with the assistance of two OUT instructions. Subsequently, the memory protection logic is again switched on at the second following instruction fetch cycle, and thus still allows the execution of a jump instruction residing in the protected area of the operation system, to start a user program residing in the unprotected area.

Figure 3:
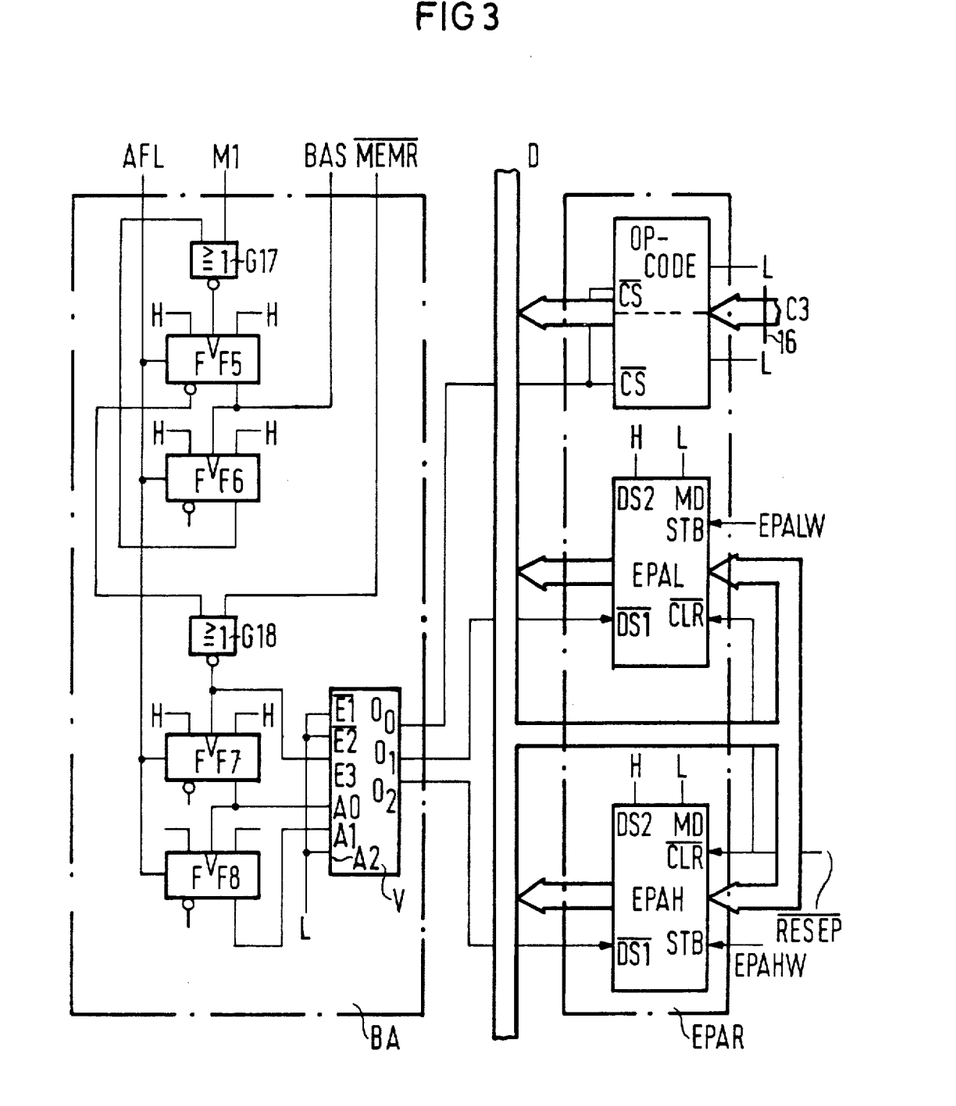
FIG. 3 is a more detailed functional block diagram of the instruction lock-on device BA and the entry point register EPAR of FIG. 1.

The instruction lock-on device BA, the circuit of which is shown in FIG. 3, is started upon the command of the control logic STL. At the next instruction fetch cycle, synchronized with the signal $\overline{\text{MEMR}}$, it switches the rigidly pre-determined operation code of a jump instruction onto the data bus D. The next two $\overline{\text{MEMR}}$ impulses then lead to the locking-on of the content of the two halves EPAL and EPAH of the entry point address register EPAR, into which a system program previously stored the target address of the jump instruction. After the instruction lock-on, the logic is inhibited until started again by the control logic STL.

Figure 4:
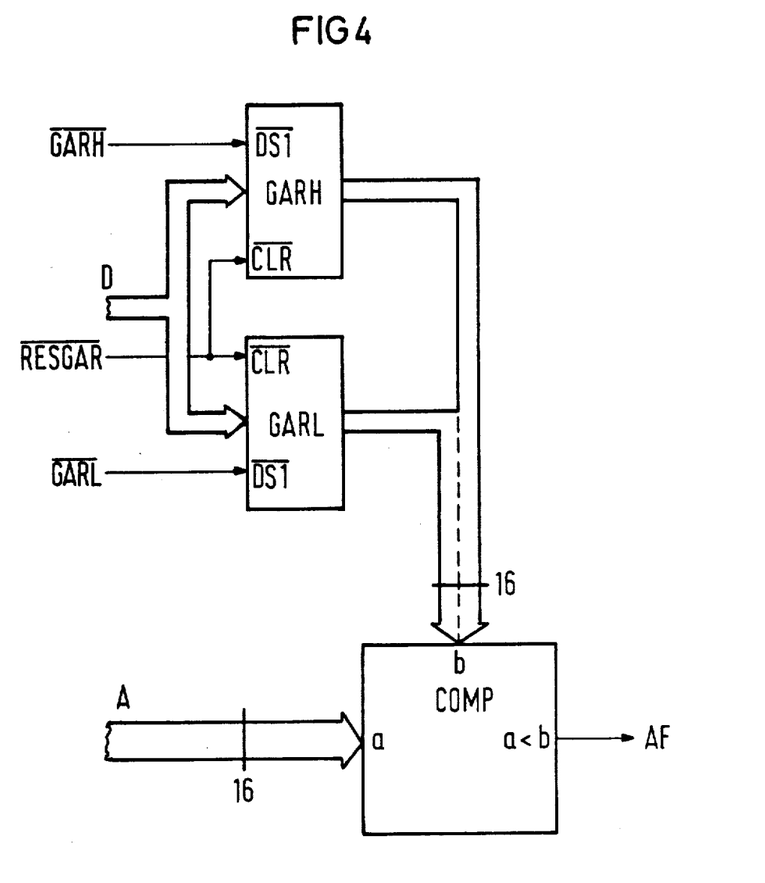
FIG. 4 is a functional block diagram in simplified form, illustrating a buffer limit address register and a comparator.
Figure 5:
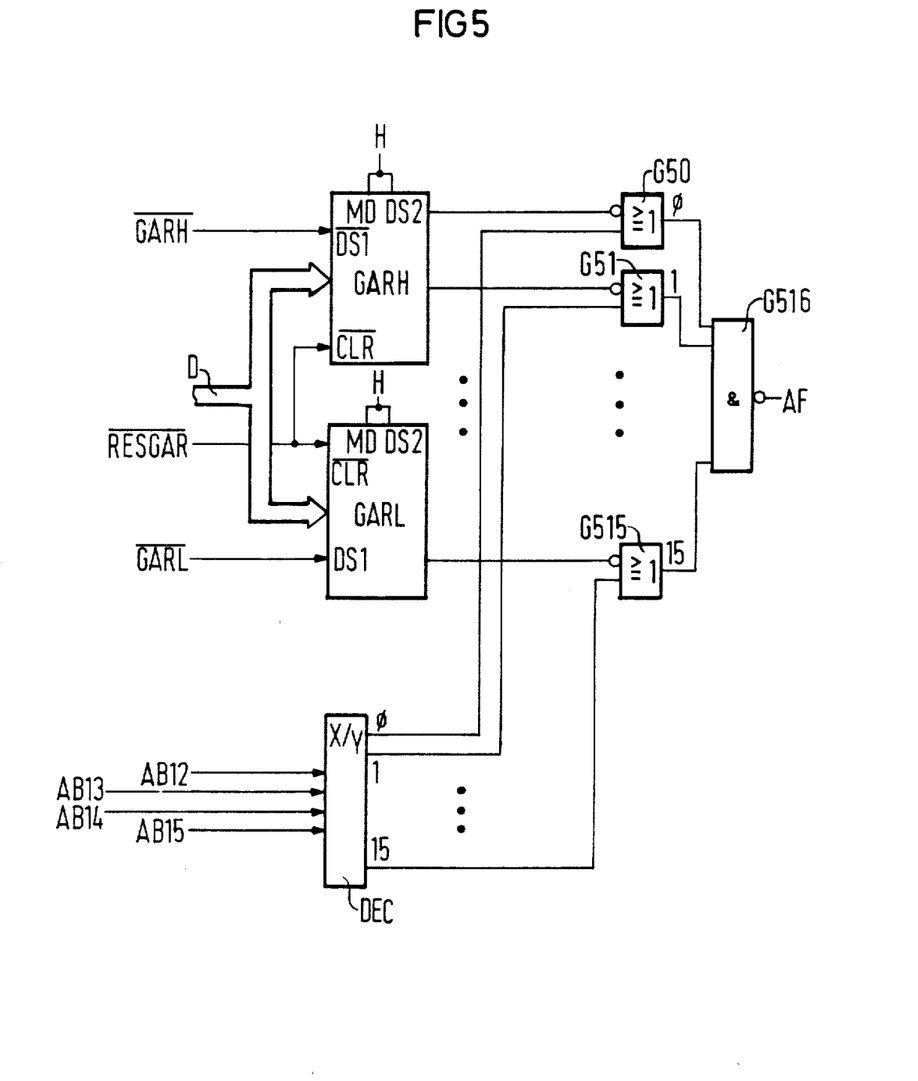
FIG. 5 is a functional block diagram of a system for protecting a plurality of memory areas in the data processing system.

Two variations of the address error recognition device AFE (FIG. 1) may be employed, depending on the number and the length of the memory areas to be protected. These two arrangements are shown in FIGS. 4 and 5. When only one continuous area, lying between the lowest address $\phi$ and an upper buffer limit address, is to be protected, the circuit illustrated in FIG. 4 is employed. This circuit compares the content of the buffer limit address register GAR with the information pending on the address bus A, and supplies an error signal at its output connected to the line AF, when the value of the pending address is smaller than the buffer limit address.

When a plurality of non-continuous memory areas are to be protected, then the circuit illustrated in FIG. 5 is employed. As an example, the total memory illustrated in FIG. 5 is subdivided into 16 blocks each with a storage capacity of 4 KByte. The system programmer can prevent access to these blocks by setting the corresponding bits in the buffer limit address register GAR. By means of the 1-of-16 decoder DEC, and the circuitry connected thereto, an error signal is produced at the output when the information pending at the address bus A points to a protected memory block.

Figure 6:
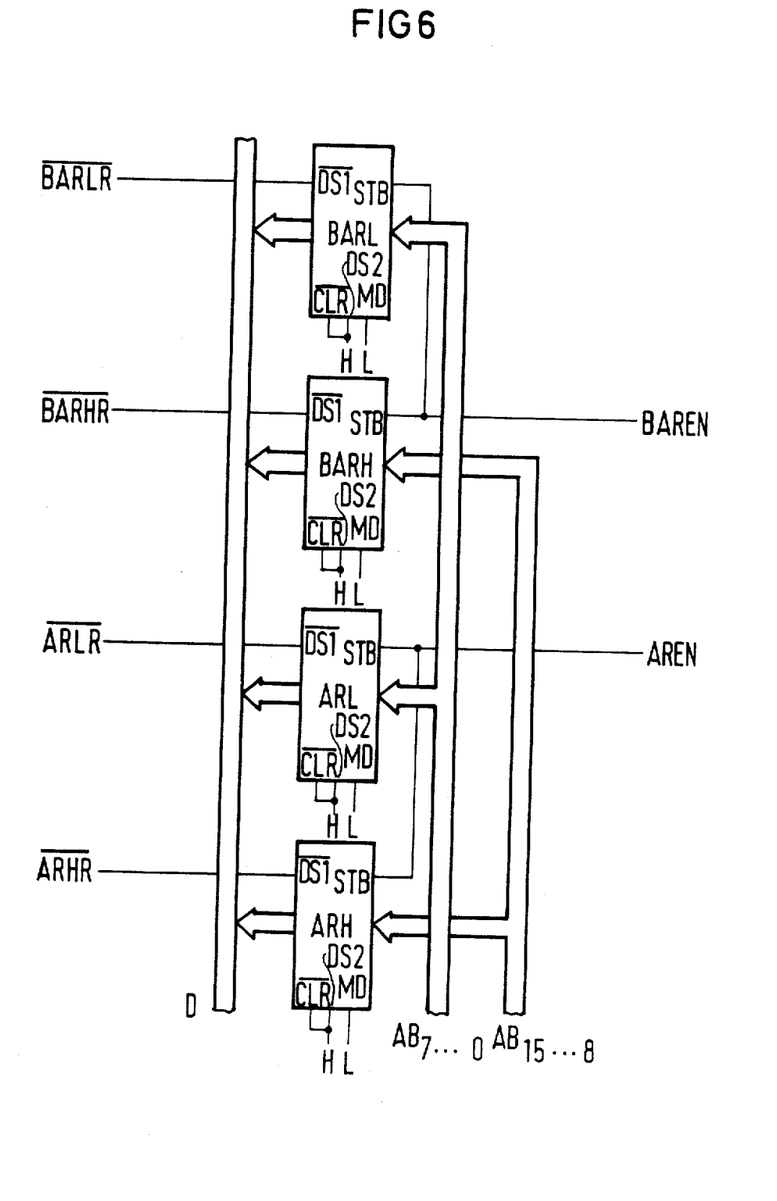
FIG. 6 is a functional block diagram of a register illustrated in FIG. 1.

The register units illustrated in FIG. 6 facilitate the analysis of a memory protection alarm. To that end, the information pending at the address bus A at each machine cycle is stored in the address register AR, made up of units ARL and ARH. The instruction address register BAR (containing BARL and BARH) stores only the address occurring during the first machine cycle of an instruction. Both registers are inhibited after an address error, so that the address of the instruction which caused the memory protection alarm, as well as the address to which access was attempted, can be read out of the corresponding registers by a system program.

Figure 7:
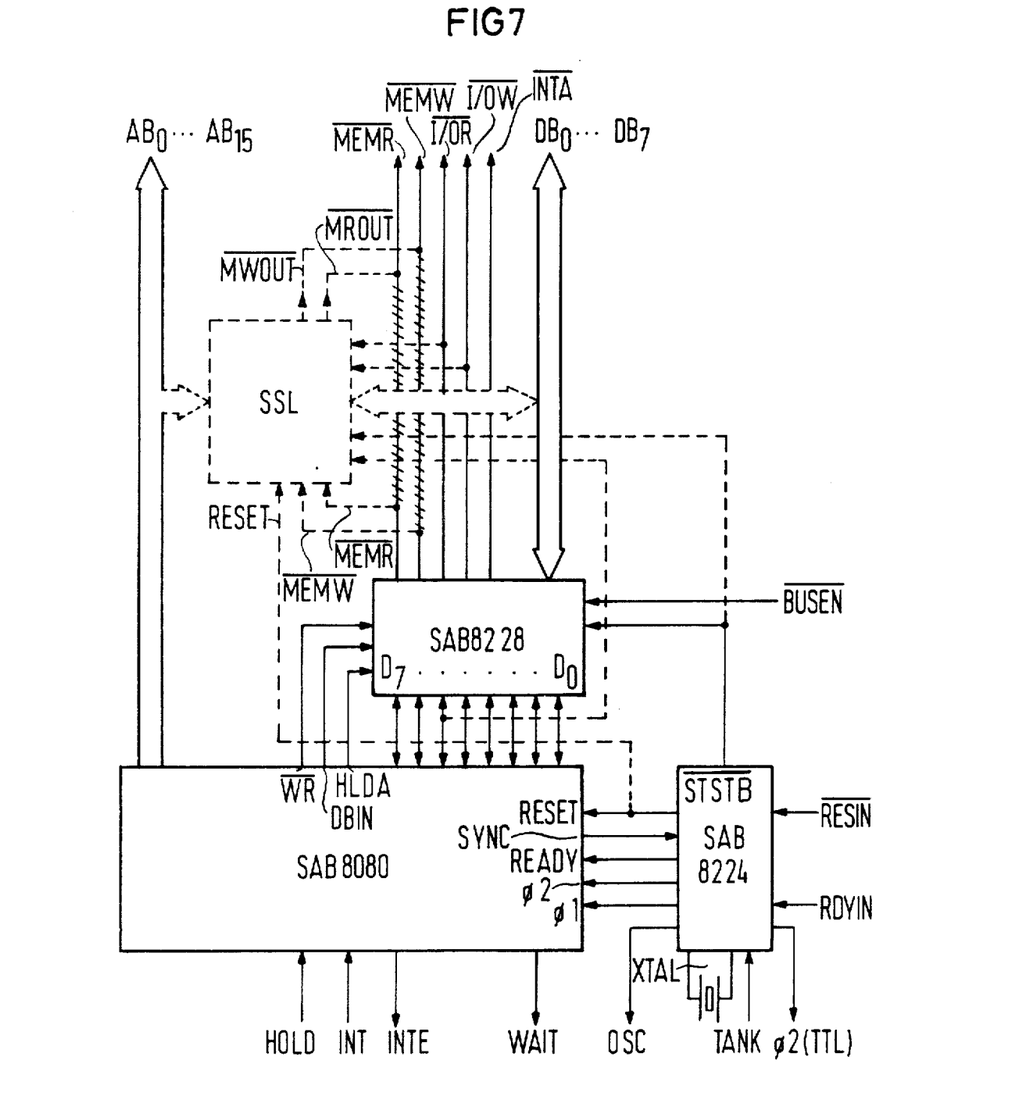
FIG. 7 is a functional block diagram of an embodiment of the present invention incorporating the microprocessor SAB8080.

The interconnection of the programmable memory protection logic of the present invention with a SAB 8080 microprocessor system is illustrated in FIG. 7. As can be seen, the memory protect logic SSL is connected with the conventional units of an SAB 8080 MPU group in a manner similar to an I/O module. In addition, however, the entire address bus A, the control signals STSTB and RESET, and the data bus bits ($D_5$ coming directly from the processor are connected as inputs. The lines $\overline{\text{MEMR}}$ and $\overline{\text{MEMW}}$ are interrupted, as shown, for the memory protection circuit. The control of the memory then ensues by means of the outputs $\overline{\text{MROUT}}$ and $\overline{\text{MWOUT}}$ of the memory protection logic.

The symbols illustrated in the drawings for the various components will be recognized as conventional, and therefore need not be described in detail. Registers, gates, decoders, flip-flops and inverters are all identified by an appropriate functional symbol, and the one shot multivibrator MF (FIG. 2) is identified by its time constant of 50 ns. Buses are identified conventionally as to the number of parallel bits they contain. The unit V is a sequencer, such as a PLA, for developing output signals on its outputs for controlling transfer of the content of the three register components of the entry point register EPAR to the data bus D. The units of FIG. 7 are well known microprocessor components and are identified by their chip numbers.

From the foregoing it can be seen that the present invention offers a relatively simple and effective means for providing the required protection to specified memory areas. Various modifications and additions may be made in the apparatus of the present invention without departing from the essential features of novelty thereof, which are intended to be defined and secured by the appended claims.

What is claimed is:

1. A programmable memory protection system for a microprocessor system comprising in combination;
a buffer limit address register adapted to receive and store at least one buffer limit address identifying a memory area to be protected,
an address error recognition device connected to said buffer limit address register and to an address bus of said microprocessor system and responsive thereto for producing an address error signal when the address on said address bus is within the protected memory area,
said address error recognition device comprising a decoder having its inputs connected to a group of the highest order bit lines of the address bus,
said buffer limit address register storing a plurality of binary bits corresponding to a specific memory block, said bits identifying whether or not such block is protected,
a plurality of gates individually connected with said decoder and with said buffer limit address register for comparing the bits stored in said buffer limit address register with the information on said address bus,
circuit means interconnected with said gates for producing an address error signal in response to operation of said gates,
and a control logic unit connected to said address error recognition device and responsive to said address error signal for suppressing a memory write signal.

2. A programmable memory protection system for a microprocessor system comprising in combination;
a buffer limit address register adapted to receive and store at least one buffer limit address identifying a memory area to be protected,
an address error recognition device connected to said buffer limit address register and to an address bus of said microprocessor system and responsive thereto for producing an address error signal when the address on said address bus is within the protected memory area, and a control logic unit connected to said address error recognition device and responsive to said address error signal for suppressing a memory write signal, said control logic unit comprising means for supplying a signal to an address register and to an instruction address register, after reception of an address error signal, for inhibiting a further transfer of an address and thereby retaining the address of the instruction causing the error signal and the address of the inaccessible memory location.

3. A programmable memory protection system for a microprocessor system comprising in combination;

a buffer limit address register adapted to receive and store at least one buffer limit address identifying a memory area to be protected, an address error recognition device connected to said buffer limit address register and to an address bus of said microprocessor system and responsive thereto for producing an address error signal when the address on said address bus is within the protected memory area, a control logic unit connected to said address error recognition device and responsive to said address error signal for suppressing a memory write signal, and means responsive to said address error signal for inhibiting operation of a following instruction, and for instead causing execution of a jump command, by which the address of the instruction causing the address error and the address of the inaccessible memory location are output to an output device for the purpose of error analysis.

4. A programmable memory protection system for a microprocessor system comprising in combination;

a buffer limit address register adapted to receive and store at least one buffer limit address identifying a memory area to be protected, an address error recognition device connected to said buffer limit address register and to an address bus of said microprocessor system and responsive thereto for producing an address error signal when the address on said address bus is within the protected memory area, and a control logic unit connected to said address error recognition device and responsive to said address error signa for suppressing a memory write signal, said microprocessor system comprising an SAB 8080 MPU, means for connecting the memory write and memory read command lines of said MPU with said control logic unit and not directly wth the memory, and means for connecting said memory protection logic with the address bus and the data bus of said microprocessor system, to the data bus line number 5 of said microprocessor to a reset line, and to a signal control line to said microprocessor system.

* * * * *